(12) United States Patent
Junod

(10) Patent No.: US 12,071,800 B2
(45) Date of Patent: Aug. 27, 2024

(54) AUTOMATIC BED COVER DOOR SYSTEMS FOR A TRUCK

(71) Applicant: Leer Group, Elkhart, IN (US)

(72) Inventor: Marcus K. Junod, LaPorte, IN (US)

(73) Assignee: Leer Group, Elkhart, IN (US)

( * ) Notice: Subject to any disclaimer, the term of this patent is extended or adjusted under 35 U.S.C. 154(b) by 0 days.

(21) Appl. No.: 18/473,678

(22) Filed: Sep. 25, 2023

(65) Prior Publication Data

US 2024/0011344 A1 Jan. 11, 2024

Related U.S. Application Data

(63) Continuation of application No. 17/459,226, filed on Aug. 27, 2021, now Pat. No. 11,767,700, which is a continuation of application No. 16/170,606, filed on Oct. 25, 2018, now Pat. No. 11,105,139.

(60) Provisional application No. 62/577,987, filed on Oct. 27, 2017.

(51) Int. Cl.
| | |
|---|---|
| *E05F 15/60* | (2015.01) |
| *B60J 7/14* | (2006.01) |
| *B60J 7/16* | (2006.01) |
| *E05F 15/40* | (2015.01) |

(Continued)

(52) U.S. Cl.
CPC .............. *E05F 15/60* (2015.01); *B60J 7/141* (2013.01); *B60J 7/1607* (2013.01); *E05F 15/40* (2015.01); *E05F 15/41* (2015.01); *E05F 15/622* (2015.01); *E05Y 2201/434* (2013.01); *E05Y 2201/686* (2013.01); *E05Y 2201/696* (2013.01); *E05Y 2400/36* (2013.01); *E05Y 2400/44* (2013.01); *E05Y 2400/52* (2013.01); *E05Y 2400/56* (2013.01); *E05Y 2400/612* (2013.01); *E05Y 2400/85* (2013.01); *E05Y 2900/516* (2013.01);

(Continued)

(58) Field of Classification Search
CPC . E05F 15/60; E05F 15/40; E05F 15/41; E05F 15/622; B60J 7/141; B60J 7/1607; E05Y 2201/434; E05Y 2201/686; E05Y 2201/696; E05Y 2400/36; E05Y 2400/44; E05Y 2400/52; E05Y 2400/56; E05Y 2400/612; E05Y 2400/85; E05Y 2900/516; E05Y 2900/53; E05Y 2900/544
USPC .......................................................... 701/49
See application file for complete search history.

(56) References Cited

U.S. PATENT DOCUMENTS

| | | | | |
|---|---|---|---|---|
| 6,164,015 A | * | 12/2000 | Kawanobe | ............ E05F 15/646 49/360 |
| 2006/0164029 A1 | * | 7/2006 | Suzuki | .................... E05F 15/42 318/283 |

(Continued)

*Primary Examiner* — Mahmoud S Ismail
(74) *Attorney, Agent, or Firm* — Barnes & Thornburg LLP

(57) ABSTRACT

A truck is provided that includes a bed section located rear of a cab section. The bed section is bounded on each side by opposing first and second upward-extending sidewalls, respectively. The truck also includes a truck bed cover that sits over the bed section on at least the first and second upward-extending sidewalls, and includes a door portion to create selective accessibility to the bed section of the pickup truck. The door portion is movable with respect to the first and second upward-extending sidewalls between open and closed positons via an automatic bed cover drive assembly that moves the door portion between open and closed positons according to a plurality of velocities within a predetermined variance.

10 Claims, 9 Drawing Sheets

(51) Int. Cl.
 *E05F 15/41* (2015.01)
 *E05F 15/622* (2015.01)
(52) U.S. Cl.
 CPC ..... *E05Y 2900/53* (2013.01); *E05Y 2900/544* (2013.01)

(56) References Cited

U.S. PATENT DOCUMENTS

| | | | |
|---|---|---|---|
| 2006/0181108 A1* | 8/2006 | Cleland | E05F 15/43 296/146.4 |
| 2007/0132264 A1* | 6/2007 | Koneval | B62D 33/0273 296/57.1 |
| 2019/0193536 A1* | 6/2019 | Pompili | B60J 7/141 |

\* cited by examiner

AUTOMATIC BED COVER DOOR SYSTEMS FOR A TRUCK

RELATED APPLICATIONS

The present Application is a Continuation Application of Continuation application Ser. No. 17/459,226, filed on Aug. 27, 2021, which is a Continuation Application of U.S. patent application Ser. No. 16/170,606, filed on Oct. 25, 2018, titled "Automatic Bed Cover Door Systems for a Truck." The present Application also relates to and claims priority to U.S. Provisional Patent Application, Ser. No. 62/577,987, filed on Oct. 27, 2017. The subject matter disclosed in these Applications are hereby expressly incorporated into the present Application.

TECHNICAL FIELD AND SUMMARY

The present disclosure relates to pickup truck caps, and particularly to a sequencer system to automatically open and close a cap door of the pickup truck cap.

An illustrative embodiment of the present disclosure provides a pickup truck that includes a bed section located rear of a cab section. The bed section is bounded on each side by opposing first and second upward-extending sidewalls, respectively. The pickup truck comprises a truck bed cover that sits over the bed section on at least the first and second upward-extending sidewalls; wherein the truck bed cover includes a door portion to create selective accessibility to the bed section of the pickup truck; wherein the door portion is movable with respect to the first and second upward-extending sidewalls between open and closed positons; an automatic bed cover drive assembly that moves the door portion between open and closed positions, the automatic bed cover drive assembly comprises: at least one strut that moves the door portion; a motor that moves the at least one strut; a sequencer in electronic communication with the motor and directs operation of the motor; an open input in communication with the sequencer to initiate an open signal to the sequencer; a close input in communication with the sequencer to initiate a close signal to the sequencer; wherein the door portion is moved by the at least one strut according to a plurality of velocities within a predetermined variance. The sequencer also cyclically monitors the plurality of velocities of the at least one strut to determine whether there is a variance in velocity that is outside the predetermined variance which is indicative of a potentially unsafe condition. When the sequencer detects the variance in velocity that is outside the predetermined variance the sequencer changes operation of the motor to change movement of the strut to change movement of the door portion or stop the door portion.

In the above and other illustrative embodiments, the pickup truck may further comprise: the plurality of velocities by the at least one strut that moving the door portion between the open position and the closed position comprise acceleration, constant velocity, and deceleration; the open input being selected from the group consisting of a keypad (e.g., capacitive touch, button, etc.), phone app, key fob, key, Bluetooth, Wifi, RFID device, NFC device, computer, and any other mobile connectivity; the close input being selected from the group consisting of a keypad (e.g., capacitive touch, button, etc.), phone app, key fob, key, Bluetooth, Wifi, RFID device, NFC device, computer, and any other mobile connectivity; the at least one strut being selected from the group consisting of a rod, bar, solenoid, piston assembly, and rotating screw; the open input initiating the open signal to the sequencer to move the at least one strut according to the plurality of velocities within the predetermined variance to move the door portion from the closed position to the open position, and when the sequencer detects the variance in velocity that is outside the predetermined variance, the sequencer changes operation of the motor to change movement of the strut to change movement of the door portion such that the at least one strut is stopped; the close input initiating the close signal to the sequencer to move the at least one strut according to the plurality of velocities within the predetermined variance to move the door portion from the open position to the closed position, and when the sequencer detects the variance in velocity that is outside the predetermined variance, the sequencer changes operation of the motor to change movement of the strut to change movement of the door portion such that the at least one strut is caused to reverse direction to move the door portion towards the open position or stop; and the truck bed cover being selected from the group consisting of a tonneau cover and a truck bed cap.

Another illustrative embodiment of the present disclosure provides a pickup truck that includes a bed section located rear of a cab section. The bed section is bounded on each side by opposing first and second upward-extending sidewalls, respectively. The pickup truck comprises a truck bed cover that sits over the bed section on at least the first and second upward-extending sidewalls; wherein the truck bed cover includes a door portion to create selective accessibility to the bed section of the pickup truck; wherein the door portion is movable with respect to the first and second upward-extending sidewalls between open and closed positons; an automatic bed cover drive assembly that moves the door portion between open and closed positons; wherein the automatic bed cover drive assembly moves the door portion according to a plurality of velocities within a predetermined variance; and wherein the automatic bed cover drive assembly monitors the plurality of velocities to determine whether there is a variance in velocity that is outside the predetermined variance and changes movement of the door portion in response to the variance in velocity.

In the above and other illustrative embodiments, the pickup truck may further comprise: the automatic bed cover drive assembly further comprising at least one strut that moves the door portion and a motor that moves the at least one strut; the automatic bed cover drive assembly further comprising a sequencer in electronic communication with the motor and directs operation of the motor, an open input in communication with the sequencer to initiate an open signal to the sequencer, and a close input in communication with the sequencer to initiate a close signal to the sequencer; the door portion being moved by the at least one strut according to the plurality of velocities within a predetermined variance, and wherein the sequencer cyclically monitors the plurality of velocities of the at least one strut to determine whether there is a variance in velocity that is outside the predetermined variance which is indicative of a potentially unsafe condition; the open input initiating the open signal to the sequencer to move the at least one strut according to the plurality of velocities within the predetermined variance to move the door portion from the closed position to the open position, and when the sequencer detects the variance in velocity that is outside the predetermined variance, the sequencer changes operation of the motor to change movement of the strut to change movement of the door portion such that the at least one strut is stopped; and the close input initiating the close signal to the sequencer to move the at least one strut according to the plurality of velocities within the predetermined variance to move the door portion from the open position to the closed position, and when the sequencer detects the variance in velocity that is outside the predetermined variance, the sequencer changes operation of the motor to change movement of the strut to change movement of the door portion such that the at least one strut is caused to reverse direction to move the door portion towards the open position or stop.

Another illustrative embodiment of the present disclosure provides a method of controlling a motor comprising: providing a door portion on a bed cover on a pickup truck, wherein the pickup truck includes a bed section located rear of a cab section, wherein the bed section is bounded on each side by opposing first and second upward-extending sidewalls, respectively, and the bed cover sits over the bed section on at least the first and second upward-extending sidewalls; providing a sequencer for the pickup truck that initiates a plurality of velocities of a motor that moves a strut that moves the door portion between open and closed positions, and monitors movement of the strut; accelerating the motor that accelerates movement of the door portion; monitoring the distance of travel of the strut; determining the distance of travel of the strut relative to a first velocity transition of the plurality of velocities of the motor; determining whether the strut has reached the first velocity transition; continuing accelerating the motor that accelerates movement of the door portion when the strut has not reached the first velocity transition; moving the motor at a constant velocity once the distance of travel of the strut has reached the first velocity transition; determining the distance of travel of the strut relative to a second velocity transition of the plurality of velocities of the motor; determining whether the strut has reached the second velocity transition; continuing moving the motor at the constant velocity when the strut has not reached the second velocity transition; decelerating the motor once the distance of travel of the strut has reached the second velocity transition; determining the distance of travel of the strut relative to a third velocity transition of the plurality of velocities of the motor; determining whether the strut has reached the third velocity transition; continuing decelerating the motor when the strut has not reached the third velocity transition; stopping the motor once the distance of travel of the strut has reached the third velocity transition; and monitoring whether the movement of the strut during the movement of the door portion between the open and closed positions is within a predetermined acceptable variance in velocity by: (a) detecting movement of the strut; (b) determining a variance in velocity of movement of the strut; (c) determining whether the variance in velocity of movement of the strut is within the predetermined acceptable variance; and (d) changing operation of the motor to change movement of or stop the strut to change movement of or stop the door portion when the variance in velocity is outside the predetermined acceptable variance.

In the above and other illustrative embodiments, the method of controlling the motor may further comprise the steps of: upon condition of opening the door portion, stopping movement of the door portion as the changing operation of the motor to change movement of the strut to change movement of the door portion when the variance in velocity is outside the predetermined acceptable variance; and upon condition of closing the door portion, reversing direction of the door portion towards the open position as the changing operation of the motor to change movement of the strut to change movement of the door portion when the variance in velocity is outside the predetermined acceptable variance.

Another illustrative embodiment of the present disclosure provides a method of controlling a motor comprising: providing a door portion on a bed cover on a pickup truck, wherein the pickup truck includes a bed section located rear of a cab section, wherein the bed section is bounded on each side by opposing first and second upward-extending sidewalls, respectively, and the bed cover sits over the bed section on at least the first and second upward-extending sidewalls; providing a sequencer for the pickup truck that initiates a plurality of velocities of a motor that moves a strut that moves the door portion between open and closed positions, and monitors movement of the strut; accelerating the motor that accelerates movement of the door portion; monitoring the distance of travel of the strut; determining the distance of travel of the strut relative to a first velocity transition of the plurality of velocities of the motor; determining whether the strut has reached the first velocity transition; continuing accelerating the motor that accelerates movement of the door portion when the strut has not reached the first velocity transition; moving the motor at a constant velocity once the distance of travel of the strut has reached the first velocity transition; determining the distance of travel of the strut relative to a second velocity transition of the plurality of velocities of the motor; determining whether the strut has reached the second velocity transition; continuing moving the motor at the constant velocity when the strut has not reached the second velocity transition; decelerating the motor once the distance of travel of the strut has reached the second velocity transition; determining the distance of travel of the strut relative to a third velocity transition of the plurality of velocities of the motor; determining whether the strut has reached the third velocity transition; continuing decelerating the motor when the strut has not reached the third velocity transition; and stopping the motor once the distance of travel of the strut has reached the third velocity transition.

In the above and other illustrative embodiments, the method of controlling the motor may further comprise the steps of: monitoring whether the movement of the strut during the movement of the door portion between the open and closed positions is within a predetermined acceptable variance in velocity by: (a) detecting movement of the strut, (b) determining a variance in velocity of movement of the strut, (c) determining whether the variance in velocity of movement of the strut is within the predetermined acceptable variance, and (d) changing operation of the motor to change movement of the strut to change movement of the door portion when the variance in velocity is outside the predetermined acceptable variance; and upon condition of opening the door portion, stopping movement of the door portion as the changing operation of the motor to change movement of the strut to change movement of the door portion when the variance in velocity is outside the predetermined acceptable variance, and upon condition of closing the door portion, reversing direction of the door portion towards the open position or stopping the door portion as the changing operation of the motor to change movement of the strut to change movement of the door portion when the variance in velocity is outside the predetermined acceptable variance.

Additional features and advantages of the automatic bed cover door systems for the truck will become apparent to those skilled in the art upon consideration of the following detailed descriptions as presently perceived.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Figure 1:
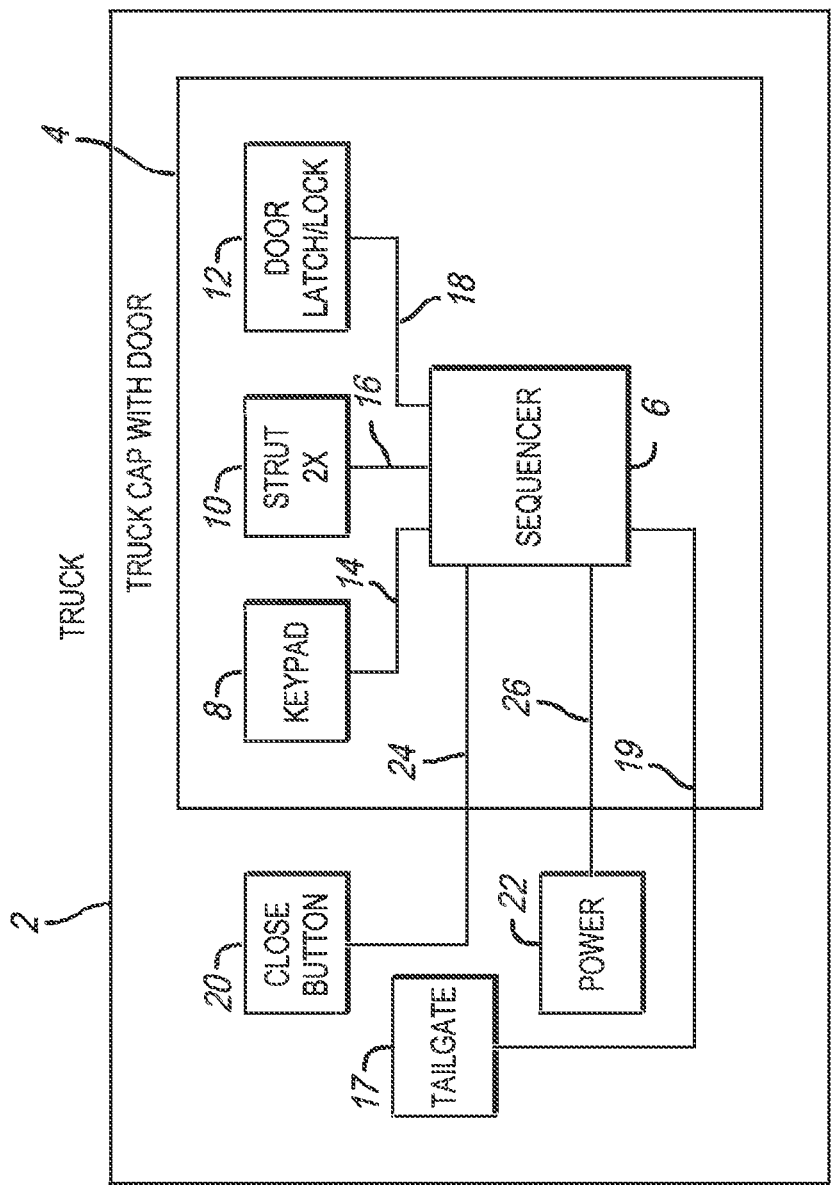
FIG. 1 is a simplified diagram of the structures that operate a cap door.

Corresponding reference characters indicate corresponding parts throughout the several views. The exemplification set out herein illustrates embodiments of the automatic bed cover door systems for the truck, and such exemplification is not to be construed as limiting the scope of the automatic bed cover door systems for the truck in any manner.

DETAILED DESCRIPTION OF THE DRAWINGS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

An illustrative embodiment of the present disclosure provides a pickup truck cap that includes a cap door. Illustratively, the automatically moving cap door may be located on the back of a truck. The cap door has the capability of automatically swinging or otherwise moving between open and closed positions. An electric motor operated strut assembly may be employed to extend the cap door to the open position or retract the cap door to the closed position. The electric motor rotates to extend or retract the strut. Illustratively, a keypad may be employed to receive a combination that will unlock a latch mechanism that secures the cap door in its closed position. Illustratively, the truck may have the ability to drop the tail-gate from its own key fob, which is separate from the invention, but the door may open based on pressing the key fob button to open the tail-gate. Additionally, a pushbutton may be provided to activate the motor to close the cap door.

Furthermore, the present disclosure includes a sequencer system that is part of a micro controller circuit to direct operation of the structures that open and close the cap door. Pressing a correct combination on a keypad (e.g., capacitive touch, button, etc.), or generating a signal from a phone app, key fob, key, Bluetooth device, Wifi device, RFID device, NFC device, computer, or other like mechanism of mobile connectivity, if the tailgate is directed to open, the sequencer sends a signal to the motor to begin opening the door. Conversely, by pressing a button on a door of the truck (or vicinity of the door), or generating a signal from the aforementioned wireless devices the door will lower to a closed and latched position.

An issue with automatically moving the cap door is related to safety—how to mitigate risks of injury (such as to fingers, arms, head, or hair) or damage to an object by the door moving between its open and closed positions.

Accordingly, embodiments of the present disclosure include a sequencer that is configured to move the truck's cap door between open and closed positions while at the same time monitor the operation of the cap door. The sequencer may include monitoring routines that detect whether there could be an obstruction between the cap door and the cap door frame that might necessitate the sequencer to alter operation of the motor or conduct another corrective measure to avert potential injury or damage to person or property. The operation of the door for normal operation and for safety measures is done cyclically, relatively fast in comparison to the door operation.

In an illustrative embodiment, the sequencer is electrically connected to a strut or struts, door latch/lock, keypad and close button. Upon activation of the keypad or signal from the aforementioned wireless devices, to either open or close the cap door, the strut initiates movement, which is called an Objective Event. The cap door will move according to a certain patterns (e.g., certain velocities) that the sequencer cyclically monitors to determine whether there is any error in that pattern indicative of a potentially unsafe condition. For example, during the retraction sequence where the cap door lowers from an open position to a closed position, the sequencer—as further described herein—cyclically monitors the movement of the door. If there is a change in the speed of movement of the door deviating from expected or mapped velocities—possibly indicative of a person's limb or other obstruction interfering with the door, the sequencer detects that anomaly. If that anomaly ends up outside an operational predetermined/expected (mapped) variance, the sequencer stops the motor or instructs the motor to reverse the strut's direction to begin raising the cap door. This assists in lessening the risk that a person's arm, finger, head, hair, etc., will get caught in the door while it is closing. The reverse is also true—when raising the cap door, if the speed at which the motor is moving the door changes to either below or above a predetermined mapped speed, the sequencer detects there may be a problem. An obstruction, for example, may be interfering with the door's movement. Because this might involve safety, when a change in speed in either the door, motor, or strut moves beyond that allowed, the sequencer will instruct the motor to stop or reverse the door's direction. As the sequencer monitors and controls motor movement, it cyclically checks for safety of operation by looking for deviations from expected normal operation. This check occurs at least about 50 times a second.

A simplified diagram of the structures that operate a cap door is shown in FIG. 1. First, the outermost box is representative of the truck, such as a pickup truck 2. Accordingly, all of the structures shown are inside the box onboard truck 2. A second box represents the truck cap 4 and cap door. Truck caps are common structures that cover the truck bed of the pickup truck. Usually the truck caps provide a height above the truck bed walls to provide additional utility space in the bed (in contrast to tonneau covers). Also, on truck caps are swinging cap doors, typically hinged at the top of the truck cap and swing upwards and downwards between open and closed positions. In this disclosure, the additional structures discussed herein are included for purposes of extending or retracting the door between open and closed positions on truck caps and tonneau covers.

Onboard the truck cap, as indicated by box 4, is a sequencer 6. Sequencer 6 is part of an electronic control system that operates the structures that will extend or retract the cap door. For instance, sequencer 6 is in electrical contact with keypad 8, strut 10, tail-gate 17 (via line 19), and door latch and lock 12 individually as indicated by lines 14, 16, 18, respectively. It is appreciated that strut 10 may represent one or more struts to move the cap door. Additionally, as part of the truck as indicated by box 2, but not on board the truck cap as indicated by box 4, is close button 20 and power supply 22. Here, close button 20 is intended to be on pickup truck 2 at any of a plurality of locations, such as on the tailgate. Additionally, the aforementioned key fob is part of the truck accessories and only applies to the opening of the tailgate. It is appreciated that the close button may alternatively reside on other locations on pickup truck 2 as well. That said, close button 20 is in electric communication with sequencer 6 via line 24. As such, close button 20, located on pickup truck 2, may be accessed independent of truck cap 4, but nevertheless send a signal to sequencer 6 through line 24 to initiate a closing sequence of the cap door. In order to operate the electronic devices that are part of the truck cap with cap door 4, power needs to be supplied to same. Illustratively, the truck's battery or other power supply, collectively identified by block 22, is on board the truck but not necessarily part of the truck cap as indicated by box 4. Nevertheless, line 26 electrically connects power supply 22 on truck 2 to sequencer 6 to provide power not only to the sequencer 6, but keypad 8, strut 10, and door latch and lock assembly 12.

Illustratively, a sequence to move the cap door may include first, entering a code with keypad 8, depressing close button 20, or initiating a signal from a wireless device. Because keypad 8 or close button 20 may be energized by power supply 22, a signal is generated and sent through line 14 to sequencer 6 that is part of the controller system which sends a signal to strut 10 to begin moving the cap door between open and closed positions. As will be discussed further herein, sequencer 6 cyclically monitors that movement of travel to ensure an unsafe condition is not occurring with the cap door. If no unsafe condition is detected, no corrective action will need to be taken. In the case of closing the cap door, once it reaches about its closed position, the door latch (which may be spring loaded) engages and latches onto the cap door to secure it into place. Additionally, the door latch and lock assembly 12 can lock the cap door so it will not open unless certain conditions are met. In reverse, to open the cap door, a code is entered into keypad 8 (or signal sent by wireless device) which, if correct, sends a signal to the sequencer which initiates extension of strut 10 to begin the cap door opening process. The door latch and lock assembly 12 will receive a signal to unlatch the cap door and strut 10 will proceed to extend the cap door to its open position. During the path of travel of the cap door, sequencer 6 cyclically monitors (at least about 50 times a second) the speed of the strut or struts 10 during this movement. If any variance in the speed is detected and that variance is either above or below a predefined threshold, sequencer 6 will instruct the motor of strut or struts 10 to stop.

Figure 2:
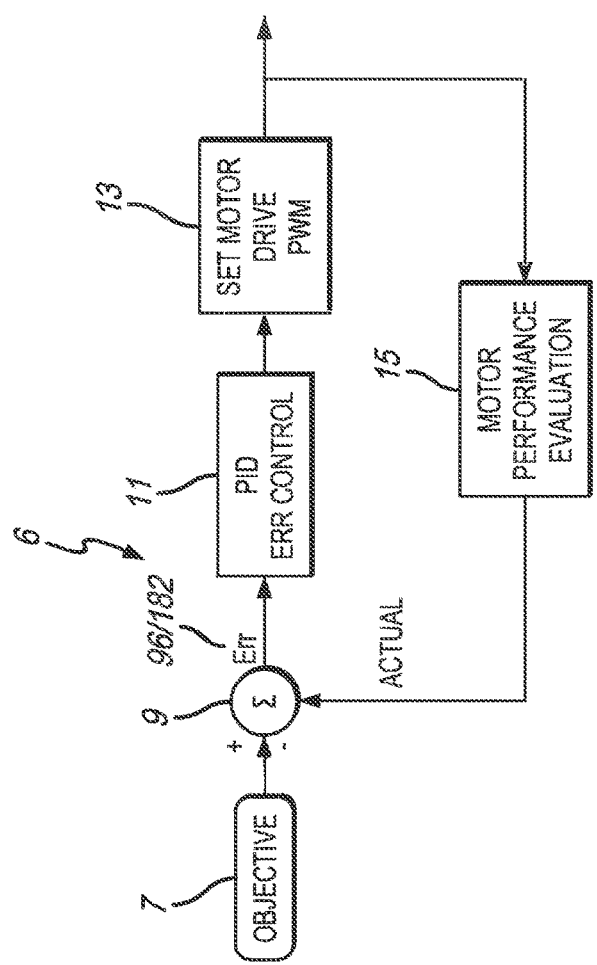
FIG. 2 is a simplified diagram of a single cycle of sequencer.

Illustratively, a simplified diagram of a single cycle of sequencer 6 is shown in FIG. 2. This cycle occurs approximately 50 times a second and is tasked with arriving at objective 7—i.e., transition points 42, 44, and 46 of FIGS. 3, and 124, 126, and 128 of FIG. 7 (for example, depending on the cycle type—door open or door close). Objective 7 is dependent upon where strut 10 is located on the extension or retraction map (see FIGS. 3 and 7, respectively). For instance, if strut 10 is located at closed position 28, objective 7 is to get to transition 42 if opening. Conversely, if strut 10 is at transition 128, objective 7 is to get to closed position 28. In other words, when either extension or retraction map is used, objective 7 is to achieve the motor speed for strut 10 as represented by velocity line 100 or velocity line 190, respectively (see FIGS. 6 and 10, respectively).

When objective 7 is identified, the primary movement of the cycle is performed by resolving two things: first, continually identifying objective 7; and second, identifying the current location as to its velocity curve in respect to its physical location. The general principal of achieving a predetermined velocity per velocity line 100 or velocity line 190 is dependent upon physical location of the cap door as it travels according to the charts in FIGS. 3 and 7. Illustratively, if strut 10 is in acceleration or ramp-up segment 34 (see FIG. 3) and extending, objective 7 is to ramp up the velocity. Likewise, if strut 10 is in ramp down segment 120 (see FIG. 7) and retracting, objective 7 is to ramp down the velocity. Strut 10 moves with a constant velocity as with during run segments 36 and 118 (see FIGS. 3 and 7, respectively).

It will be appreciated by the skilled artisan upon reading this disclosure that the position of the door—open or closed, determines what the velocity should be pursuant to velocity lines 100 or 190 (see FIGS. 6 and 10) at any particular point of travel, either in extension or retraction. Position of strut 10 is illustratively determined by two Hall Effect sensors. These sensors determine the rotational angle of the ball screw motor, and feeds sequencer 6. It will be further appreciated by the skilled artisan upon reading this disclosure that sequencer 6, determines the relative position of the door in the form of Gray code. Such Gray code provides both direction and a pulse every 36 degrees of rotation of the motor. The amount of time between each of the pulses provides a rotational velocity, w or omega, and a direction. Since this is a relative shaft encoder, the relative position is tracked additively from its starting point with the strut fully retracted.

Figure 5:
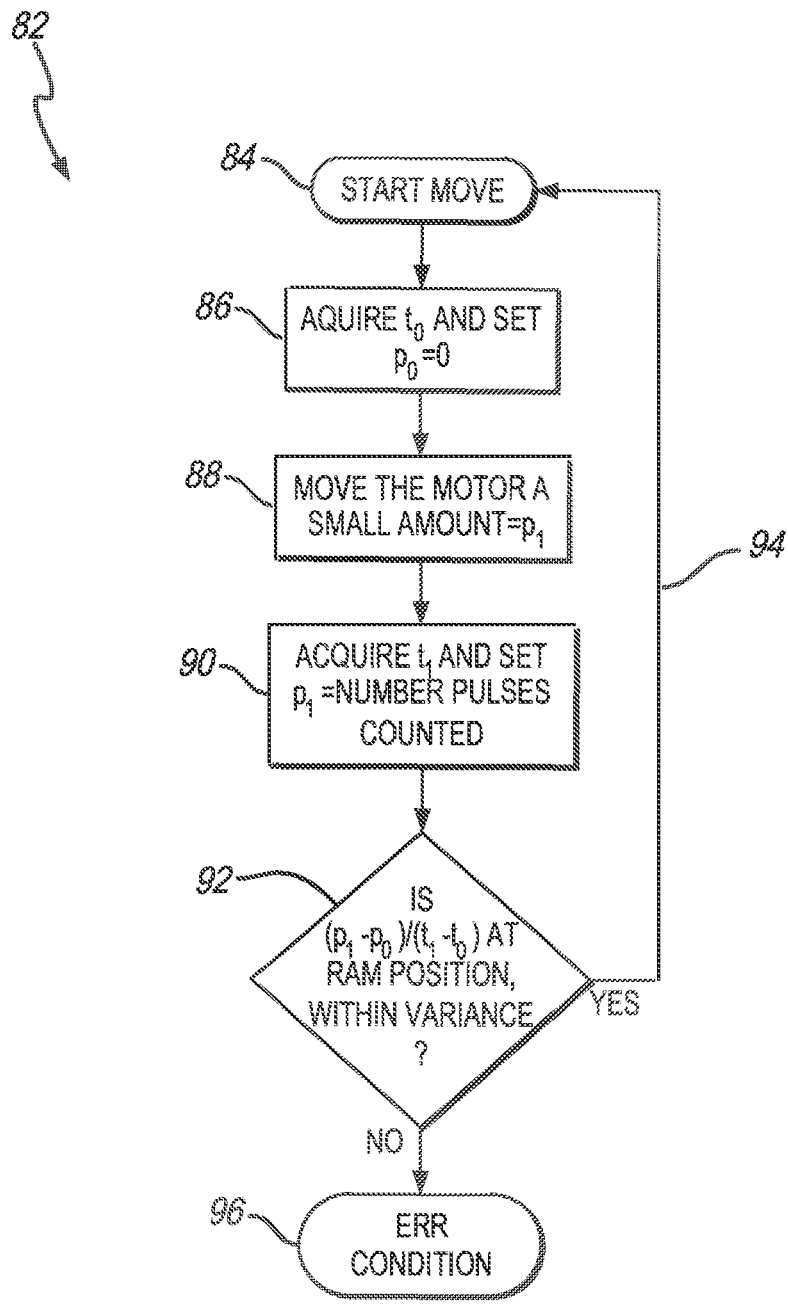
FIG. 5 is a flowchart depicting another operation of the sequencer.
Figure 9:
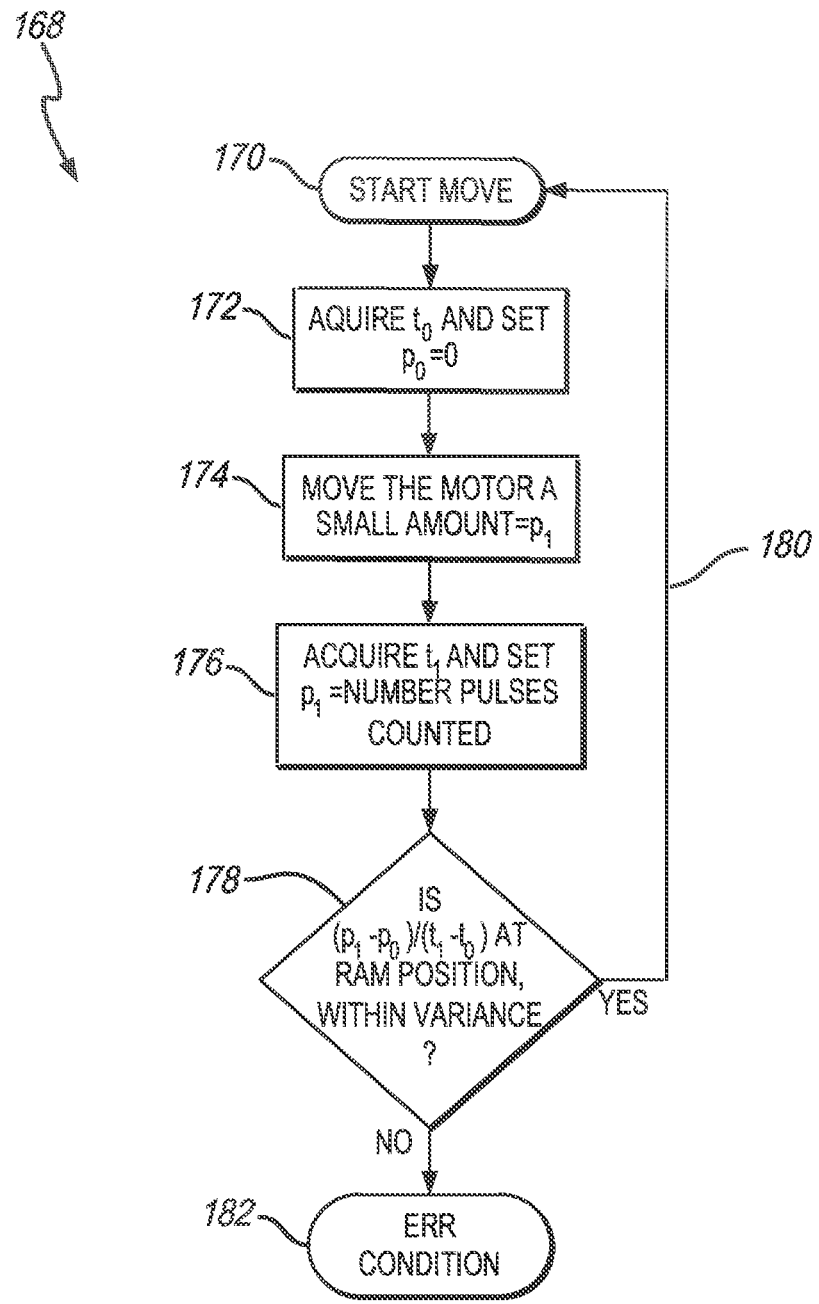
FIG. 9 is another flowchart depicting how the sequencer determines the response to the ERR value during the cap door's travel from open to close positions.

As further shown in FIG. 2, Σ (sigma) 9 takes both objective 7 velocity of the door as derived from the rotation of the Hall Effect sensors, and its position as derived from the additive approach of the motor shaft rotation pulses, and derives the ERR (error) 96 from FIG. 5, or 182 from FIG. 9. ERR 96 or 182 derivation is essential for making decisions on what action to perform next. The ERR value can mean everything is functioning well on strut 10, or it can mean that the performance of strut 10 is out of an allowable variance. If it is the latter case, corrective measures taken—the motor continues, stops, or reverses direction of travel. These three actions take the form of a safety response. With regard to FIGS. 6 and 10, there are three lines on each. The top and bottom lines indicate the ERR determining if the movement of strut 10 is either too fast, or too slow. Utilizing the conditions of the door opening being either too fast, or too slow, corrective action is taken. An extending action might dictate a stop. A retracting action might reverse the movement of the motor to backup so as not to impinge a finger, arm, head, or hair.

Figure 3:
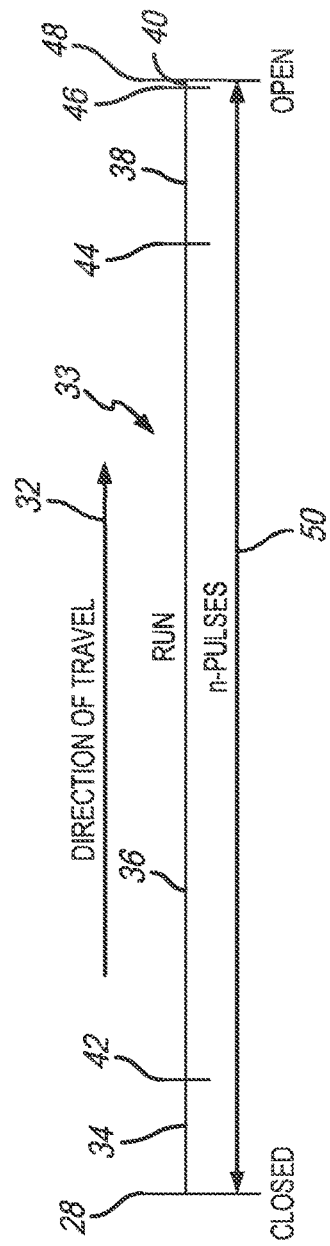
FIG. 3 is an extension position map of the cap door.
Figure 7:
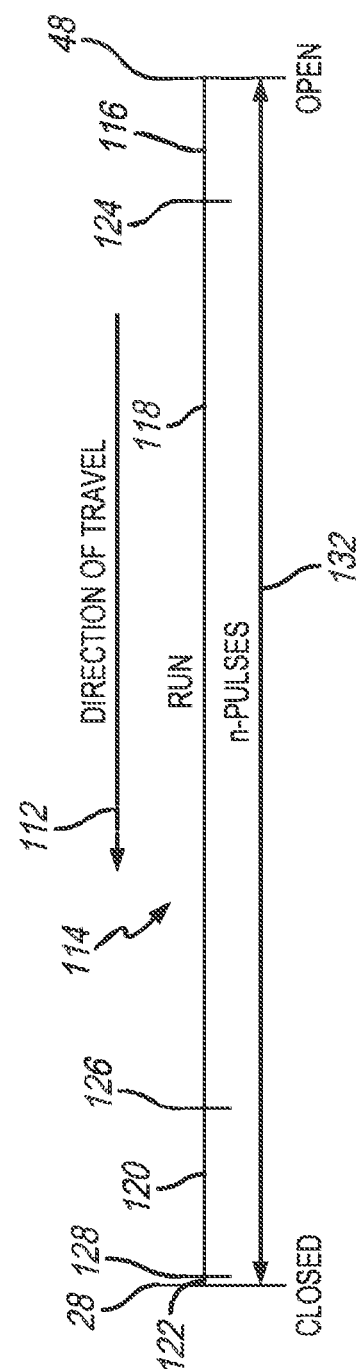
FIG. 7 is a retraction position map of the cap door.

PID (Proportional, Integral, Derivative) ERR control 11 executes all three of the actions mentioned in the prior paragraph—continue, stop, and retract. Stop and retract are special cases that either change objective 7 to be where the struts are currently located, or change objective 7 to be at a prior, reversed location. The normal case, continue, just increments the objective 7 location to the next location along the map as depicted in FIGS. 3 and 7. In all three cases, ERR 96 or 182 is sent to PID ERR control 11 which either accelerates or decelerates strut 10. The PWM (Proportional Width Modulation) control at 13 drives the strut motors with either a positive square pulse or a negative square pulse that is proportional to the average power sent to the motors. Motor Performance Evaluation 15 determines the locations as previously described. The actual location as compared to objective 7 is Σ (i.e., objective 7—actual) which is then sent to PID ERR control 11.

Illustratively, an extension position map of the cap door is shown in FIG. 3. This map depicts the cap door starting at a closed position 28 then moving until it reaches a fully open position as indicated by reference number 48. The direction of travel is indicated by reference number 32. During the course of movement of the cap door from its closed position to its open position, it will travel at a series of predetermined velocities as indicated by velocity line 100 in FIG. 6. These lines are segregated into four segments, beginning with ramp up of the velocity at segment 34, a constant velocity in run segment 36, a decrease in velocity in segment 38, and the bump or step mode as the strut approaches 40. Between each one of these segments is a transition such as the transition 42 between ramp-up segment 34 and run segment 36. A slowing transition 44 is located between run segment 36 and deceleration segment 38. A bump or step mode transition 46 is located adjacent to deceleration segment 38. And finally, an end of travel segment 40 is bound by the end touch 48, which is the end of the opening sequence of the cap door.

Figure 6:
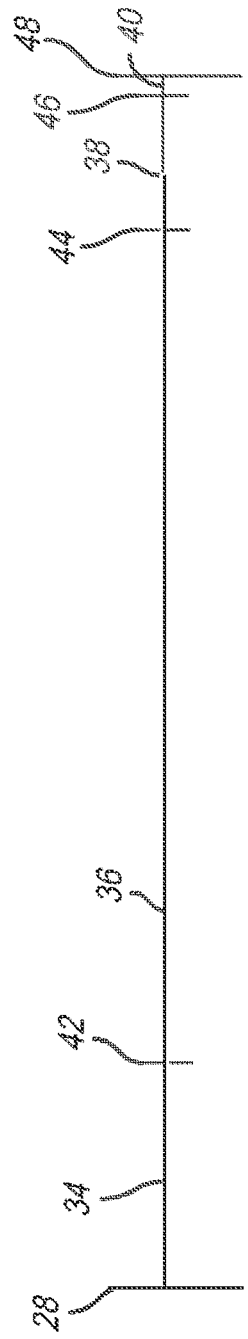
FIG. 6 is a chart showing expected velocity rates during a length of travel of the cap door.
Figure 6:
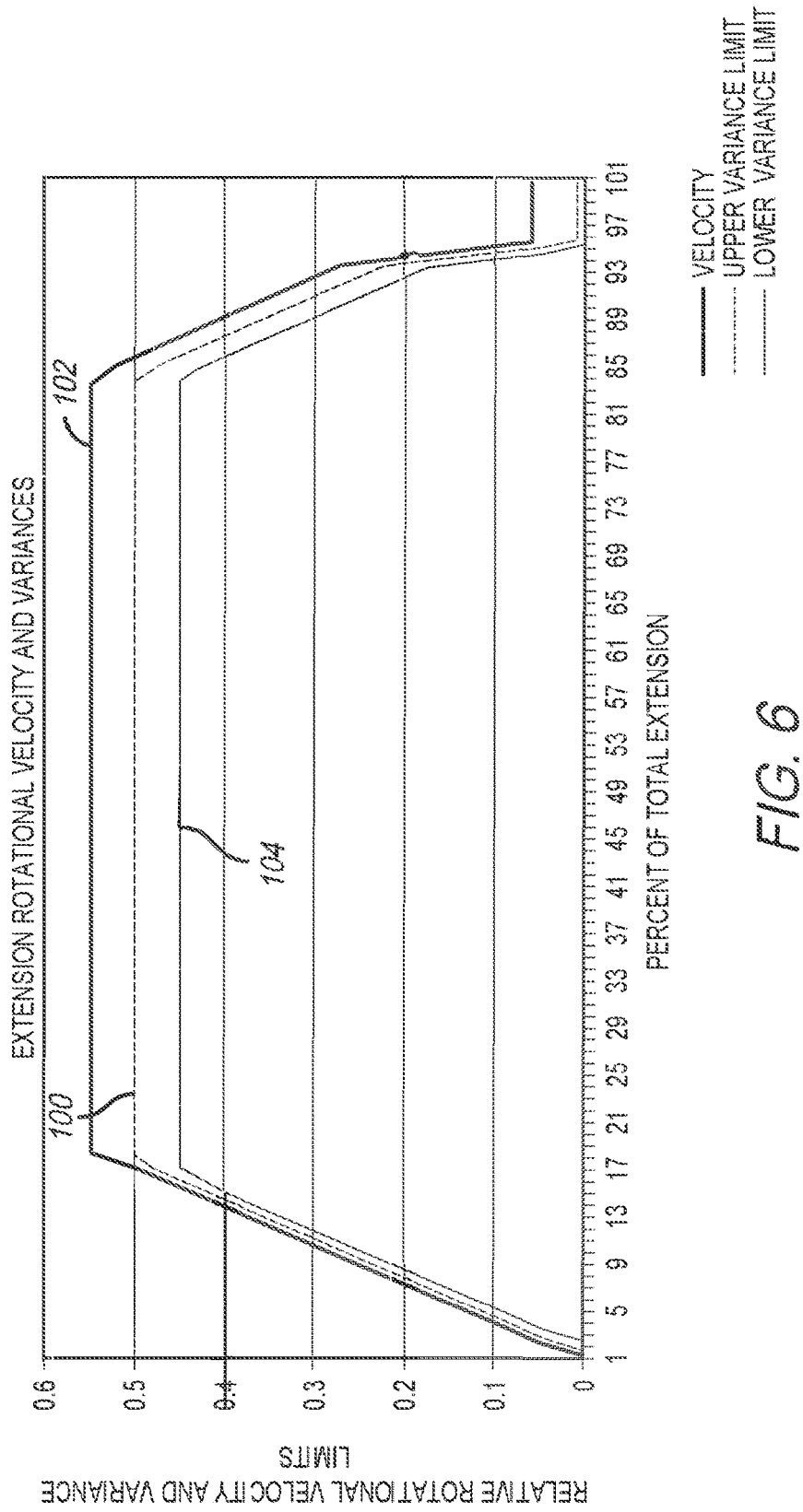

Accordingly, velocity line 33 of the cap door is representative of the predetermined velocity that the cap door will experience while moving from its closed position 28 to its open position 48. Particularly, upon initiation by sequencer 6 to move strut 10, the motor attached to strut 10 will begin moving at a velocity as indicated by velocity line 100 (see FIG. 6) in segment 34 such that it will begin opening or raising the cap door. During ramp up segment 34, movement of strut 10 is starting from zero and matching a predetermined rotational velocity ramp that follows velocity line 100 during segment 34. Once strut 10 moves the cap door at a predetermined velocity, and passes transition 42. This velocity should remain constant for much of the remaining length of travel as indicated by velocity line 100 during segment 36 to transition 44. Because moving the cap door from its closed position to its open position involves moving at different rates, FIG. 6 shows the expected velocity rates during the entire length of travel in velocity line 100. That said, once the cap door is close to its end of travel or open position, as indicated by reference numeral 44, strut 10 ramps down by reducing its velocity to match the corresponding segment 38 of velocity line 100 on FIG. 6. The structures of the door, including strut 10, the cap door or other structures may be damaged if the cap door moves at its run segment velocity all the way until it reaches its full open position 48. Accordingly, sequencer 6 begins to slow the velocity of the cap door travel from its run segment 36 at transition 44. This ramp down in velocity is indicated by segment 38, and further indicated on velocity line 100 with a slowing transition from run segment 36 to deceleration segment 38. During deceleration segment 38 of the opening sequence, strut 10 causes the cap door to slow down. Then, at just before the full end of travel of the cap door, the velocity slows even further over a shorter period of time as indicated by the small, non-zero velocity line on FIG. 6 until it reaches 100% travel or end of travel 40. End of travel 40 and the stopping position of the strut are both the same location at 100% travel on FIG. 6.

Further shown in FIG. 3, as the cap door moves between closed position 28 and open position 48, according to velocity line 100, the strut motor is generating pulses that are detected by sequencer 6. As such, sequencer 6, at the same time, is continually monitoring the predetermined velocities and transitions that are part of velocity line 100. The rotations of the strut motor are counted to give a perception of an absolute shaft angle encoder from not a relative shaft angle encoder as created by the two Hall Effect sensors. A Hall Effect sensor detects magnet pole changes attached to the shaft of strut 10 and generates a corresponding pulse signal that is sent to sequencer 6. Sequencer 6 may then determine the number of pulses that are being generated as a function of time. Sequencer 6 determines any change in the rate that it receives those pulses over time. As such, sequencer 6 uses that information to calculate the change in the rate of pulses over the change in time—referred to as ΔP/Δt. With the ΔP/Δt calculated, and an allowable variance over or under from the velocity line 100, sequencer 6 will use this derivation to determine whether the ΔP/Δt being experienced by the strut motor during travel of the cap door varies to an extent that the ΔP/Δt falls outside an acceptable variance (see FIG. 6). If the ΔP/Δt does fall outside the acceptable variance, sequencer 6 sends a signal to the motor to take a corrective action such as stopping the motor to stop travel of the cap door, or reverse direction of strut 10 to reverse the direction of travel 32 of the cap door.

Figure 4:
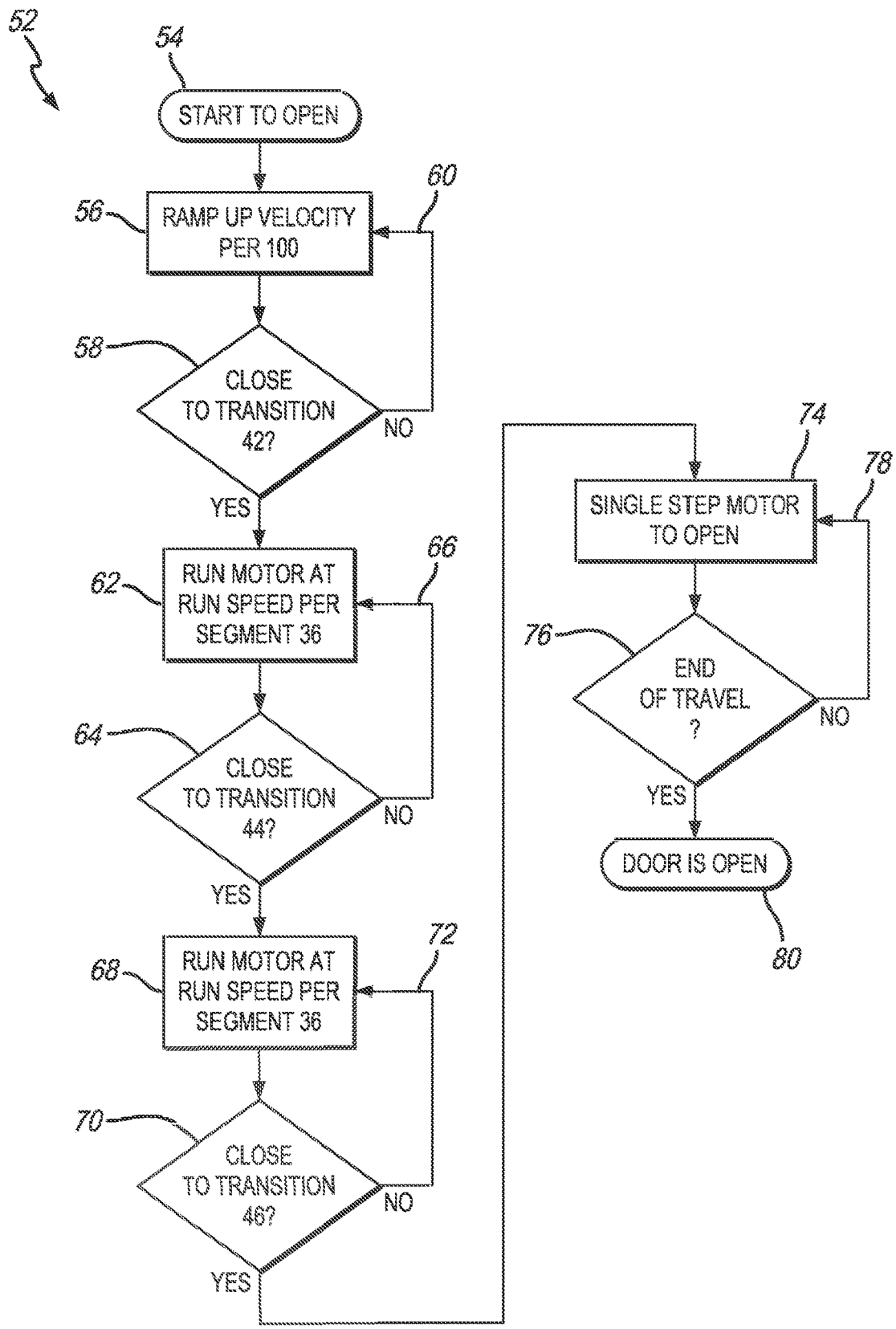
FIG. 4 is a flowchart that depicts how a sequencer controls a motor from one velocity segment to another as a strut moves a cap door according to a velocity line.

Sequencer 6, among other functions, also monitors the travel of the cap door to change the speed of the cap door movements as indicated on velocity line 100. Sequencer 6 also detects any variance in the set velocity during travel of the cap door. A flowchart 52 in FIG. 4 depicts how sequencer 6 controls the motor from one velocity segment to another, as strut 10 moves the cap door according to velocity line 100. For example, flowchart 52 starts when an open function signal is received at 54. Upon initiation of this function, the first step is to activate the motor of strut 10 and accelerate that movement during acceleration or ramp-up segment 34 (see FIGS. 3 and 6) as represented on velocity line 100. This not only initiates movement of struts 10 to move the cap door, but strut 10's velocity is increasing (i.e., accelerating) to ramp-up the speed. This operation, according to flowchart 52, begins as step 56. While the motor is accelerating and moving the cap door, sequencer 6 is monitoring the distance of travel along velocity line 33 to determine whether the cap door is yet in proximity to a transition point such as velocity segment transition 42 which, as previously discussed, is the point where the predetermined velocity is to be changed from the velocity during ramp-up to a constant run velocity during segment 36. This is indicated on flowchart 52 at block 58. If the transition point has yet to be reached by the cap door, sequencer 10 starts its cycling over again allowing further acceleration of the strut motor to both continue accelerating the door as well as moving it further towards the open position. This operation is indicated by reference numeral 60. It will be appreciated by the skilled artisan upon reading this disclosure that the operation of blocks 56 and 58 continue to loop until it has determined the cap door has reached the predetermined transition point (i.e., velocity transition 42) at which time sequencer 6 instructs the strut motor to maintain the rate of travel of the cap door as indicated by block 62. This coincides with run segment 36 as shown in FIG. 3. Again, as indicated at block 64, sequencer 6 proceeds to then determine whether it is close to the next transition point, which is velocity transition 44 as shown on velocity line 100 of FIG. 6. As indicated by line 66, if the distance of travel of the cap door has not yet reached transition 44, sequencer 6 will proceed to run the routine again as indicated by line 66. Indeed, the routine continues to loop during the course of travel of the cap door during run segment 36 until the cap door reaches slow transition 44. At this point, sequencer 6 proceeds from block 64 to block 68 wherein sequencer 6 begins causing the strut motor to decelerate to slow down the movement of the cap door as indicated by deceleration segment 38 on velocity line 33. Similarly, once this happens, sequencer 6 monitors the amount of travel of the cap door to determine whether it is close to touch transition 46 as shown in FIG. 3, and indicated at block 70 of FIG. 4. If sequencer 6 has not detected proximity of touch transition 46, it repeats this routine as indicated by line 72 of flowchart 52 and continues to change the velocity of the strut motor to further slow movement of the cap door. This process continues until the amount of travel of the cap door has increased to reach touch transition 46. As this is detected at block 70 of flowchart 52, sequencer 6 proceeds to block 74 which then single steps the strut motor to a stop. As indicated by block 74 and shown as end of travel segment 40, this routine, like the others, also detects whether the end of travel is indicated at block 76 has been reached—as indicated by end touch 48 on velocity line 33 of FIG. 2. If the end of travel for the cap door has not been reached, sequencer 6 loops back as indicated by line 78, thereby continuing the stopping process. If end of travel, as indicated at block 76, has been reached, the process has ended at block 80 which is where the cap door is in the full open position.

In an illustrative embodiment, the strut motor may be a DC motor fed by pulse width modulation (PWM). Applying more or less of a PWM duty cycle is a typical way of controlling power of the strut motor. In this application, the DC motor is fed from a PWM source which provides an average current across the motor coils. Accordingly, the increase in average current yields an increase in power from the motor to the door mechanism. As a control of the average current, PID ERR control 11, as part of sequencer 6, will be used. PID ERR control 11 will lengthen or shorten the pulses proportionally to meet the required segment velocity demands of FIG. 6.

Another operation of sequencer 6 is depicted in flowchart 82 of FIG. 5. Particularly, flowchart 82 depicts how sequencer 6 determines an ERR value during the cap door's travel from closed to open positions represented in FIG. 3. By employing the routines shown in chart 82, the ERR variance is determined. The ERR variance represent the acceptable deviation or variance of the $\Delta P/\Delta t$ that can exist without sequencer 6 initiating any corrective action. If the $\Delta P/\Delta T$ is within the predetermined variances, sequencer 6 will maintain movement of the cap door as if the movement was concurrent with the predetermined velocities along velocity line 100. If, however, the $\Delta P/\Delta t$ is large or small enough that it falls outside the predetermined variance (see, e.g., FIG. 6), then sequencer 6 will initiate a corrective action such as stopping the strut motor to cease movement of the cap door. It is appreciated that the routines shown in flowchart 82 in FIG. 5 operate in milliseconds which should be fast enough for sequencer 6 to initiate corrective action before substantial harm to either person or objects occur.

The first step of the process, as indicated by block 84, is sequencer 6 detecting movement of the cap door through pulses being generated by rotation of the strut motor. When this happens, sequencer 6 acquires an initial start time ($t_0$) and sets an initial pulse at 0 (i.e., $p_0=0$) as indicated at block 86. Once the starting time and pulse count at 0 is set, the sequencer 6 operates the motor and detects movement of the motor by some predetermined amount. That amount is set to indicate a number of pulses ($p_1$) as indicated at block 88. With the number of pulses counted at $p_1$, sequencer 6 acquires the amount of time that has elapsed ($t_1$) as indicated at block 90. The routine of sequencer 6 then moves to block 92 which determines whether the $\Delta P/\Delta t$ is within an acceptable variance. Here, $\Delta P$ is calculated to be the small amount of motor movement ($p_1$) minus the set pulse at 0 from block 86. In other words, the equation would be $\Delta P = p_1 - p_0$. The $\Delta t$ would likewise be the time transpired ($t_1$) minus the acquired start time ($t_0$). Accordingly, the equation would be $\Delta t = t_1 - t_0$. This then becomes the equation for $\Delta P/\Delta t$. If this $\Delta P/\Delta t$ variance is within a predetermined acceptable range, as indicated by line 94 on flowchart 82, then the routine returns back to block 84 which precedes to begin the routine over again—i.e., acquiring new initial start time and pulse settings, measuring the small amount of movement of the motor as indicated by the moving magnets detected by the hall affect sensors, determine the number of pulses that make up the new $p_1$ at a new acquired time set at $t_1$, and subtract again according to the $\Delta P/\Delta t$ formula (according to block 92), and determine whether this variance is within a predetermined acceptable range. And again, if yes, the routine repeats itself. This routine constantly repeats itself in milliseconds to determine if the door is moving at the predetermined velocities as represented by velocity line 100.

If, on the other hand, the $\Delta P/\Delta T$ exceeds the predetermined ERR bounds, an ERR condition as indicated at block 96 is established. If such an ERR condition is established, sequencer 6 will initiate corrective action at this point such as stopping the motor to stop movement of the cap door.

A chart depicting the $\Delta P/\Delta t$ is shown in FIG. 6. In particular, the Y axis of the shown chart depicts the relative rotational velocity and variance limits in units relative to the rotational speed of the motor and position of the door, σ or percent/100 or coefficient of variation (unitless), and motor rotational velocity ω/C, where C is a constant of proportionality. The X axis depicts the percent of total cap door extension. Line 100 represents a predetermined velocity the cap door should travel during its path of travel from closed to open positions. Line 102 represents an upper variance limit which cannot be exceeded or sequencer 6 will initiate a corrective action. Similarly, line 104 represents a lower variance limit upon which, if detected, sequencer 6 will initiate corrective action. In other words, the velocity of the cap door may only move so fast or so slow without sequencer 6 initiating corrective action. It is the routine shown in flowchart 82 of FIG. 5 that determines whether or not the $\Delta P/\Delta t$ exceeds lines 102 and 104 in FIG. 6. As shown, the slopes of lines 100, 102, and 104 are consistent with the segment of travel of the cap door pursuant to velocity line 33 of FIG. 3. For example, lines 100, 102, and 104 at the far left of the chart in FIG. 6 have a steep angle representing the increased velocity of the cap door, i.e., acceleration segment 34. It is noted that while the cap door is accelerating, the tolerance of ΔP/ΔT is relatively small. This means that during the initial movement of the cap door from stop to some accelerated movement, it must stay within that narrow predetermined acceleration or sequencer 6 will initiate corrective action. Only a small variance of ΔP/Δt is allowed. This is because a large ΔP/Δt indicative of corrective action. But once the cap door has reached a predetermined velocity and begins running at that velocity, as indicated by run segment 36, the variance or ΔP/Δt of line 100 will change to match the amount of caution required in that area of movement. This is particularly shown in the chart by line 102 representing the upper variance limit and line 104 representing the lower variance limit being spaced farther apart from line 100. In other words, run segment 36 has a larger acceptable ΔP/Δt variance as compared to acceleration segment 34. Nevertheless, if the ΔP/Δt exceeds the variance limits represented by lines 102 and 104, sequencer 6 will initiate corrective action.

It is appreciated that in the chart in FIG. 6, once the cap door reaches deceleration segment 38, the cap door slows substantially as a function of time. As further shown in FIG. 6, however, the acceptable variance limits represented by lines 102 and 104, during deceleration segment 38, is illustratively greater than acceptable variance limits during acceleration segment 34, but they are less than the acceptable limits during run segment 36. The primary mitigating factor to change the variance curves is to proportionally handle the sensitivity to the need for corrective action due to safety. Still further, during end of travel segment 40, the acceptable variance limits as represented by lines 102 and 104 narrow even further. This again means that the cap door must essentially travel pursuant to the predetermined speed with very little acceptable variance before sequencer 6 will take corrective action.

A retraction position map of the cap door is shown in FIG. 7. This map is generally opposite to the extension position map shown in FIG. 3. As such, rather than the cap door starting at closed position 28, this routine starts with the cap door at fully open position 48. In this case, the direction of travel is indicated by reference 112 and is opposite of the direction of travel indicated by reference number 48 of FIG. 3. This map shows the cap door moving from its fully open position as indicated by reference number 48 to closed position 28. Similar to what is described with the extension map in FIG. 3, in FIG. 7 it is contemplated that the cap door will travel at a series of predetermined velocities as indicated by line 114. In this case, velocity line 114 is broken up into four segments, as well as including an acceleration segment 116, run segment 118, deceleration or ramp-down segment 120, and latch and lock segment 122. Between each one of these velocity segments is a transition point similar to that described with respect to the extension position map. As shown in FIG. 7, velocity line 114 includes an acceleration transition 124 located between acceleration segment 116 and run segment 118. A deceleration transition 126 is located between run segment 118 and deceleration segment 120. A latch and lock transition 128 is located between the deceleration segment 120 and the latch and lock segment 122. Lastly, closed position 28 represents the cap door being latched and locked, thereby ending the process of moving the cap door from its open position to its closed position.

Similar to the movement of the cap door during its extension sequence, during retraction, sequencer 6 will receive a signal from close button 20. Upon receipt of that signal, sequencer 6 initiates the strut motor to move strut 10 in the opposite direction than how it moved during the extension sequence discussed in FIG. 3. Closing the cap door is a different process than opening the cap door (beyond the obvious open and closed conditions) because the sequence needs to perform a latching sequence when closed that does not occur upon opening. That said, the sequence still begins by accelerating strut 10 from stop to a predetermined speed represented by acceleration segment 116. Once the cap door has reached the predetermined velocity, which will be at acceleration transition 124, it will continue moving at this predetermined velocity for much of the length of travel. This is represented by run segment 118. Once the cap door has moved a predetermined distance during run segment 118, the cap door will reach deceleration transition 126. At this point, sequencer 6 will begin to slow the cap door before it latches. The cap door will continue to decline in velocity during deceleration segment 120 until it reaches the latch and lock transition 128. Here, if the cap door is intended to engage a latch (e.g., spring loaded latch), the motor moving strut 10 will increase its operating force to latch the door. This action occurs in the last about 1% of travel and will pull the cap door to a secure latched condition during latch and lock segment 122. Finally, at closed position 28, the cap door will be locked. Illustratively, some over-travel by the door may be employed to make certain the door is actually latched, or sensors may be employed to detect an actual latch vent. This represents the end of travel of the cap door from its open position to its closed position. In other illustrative embodiments, if a mechanical latch is employed, the related mechanisms to that mechanical latch will secure the cap door which will then be either electronically or mechanically locked. Again, some over-travel by the door may be employed to make sure the door fully engages the latch. This prevents the latch—which if spring loaded may initially push against a striker on the door—from causing the door to not be secured by the latch.

Also shown in FIG. 7 is pulse line 132. Similar to pulse line 50 from FIG. 3, sequencer 6 is generating pulses while the cap door is operating to continually monitor the predetermined velocity segments and transitions located on velocity line 114. The foregoing magnets and Hall Effect sensors operate to generate the signal that will be sent to sequencer 6 which monitors the operation.

Figure 8:
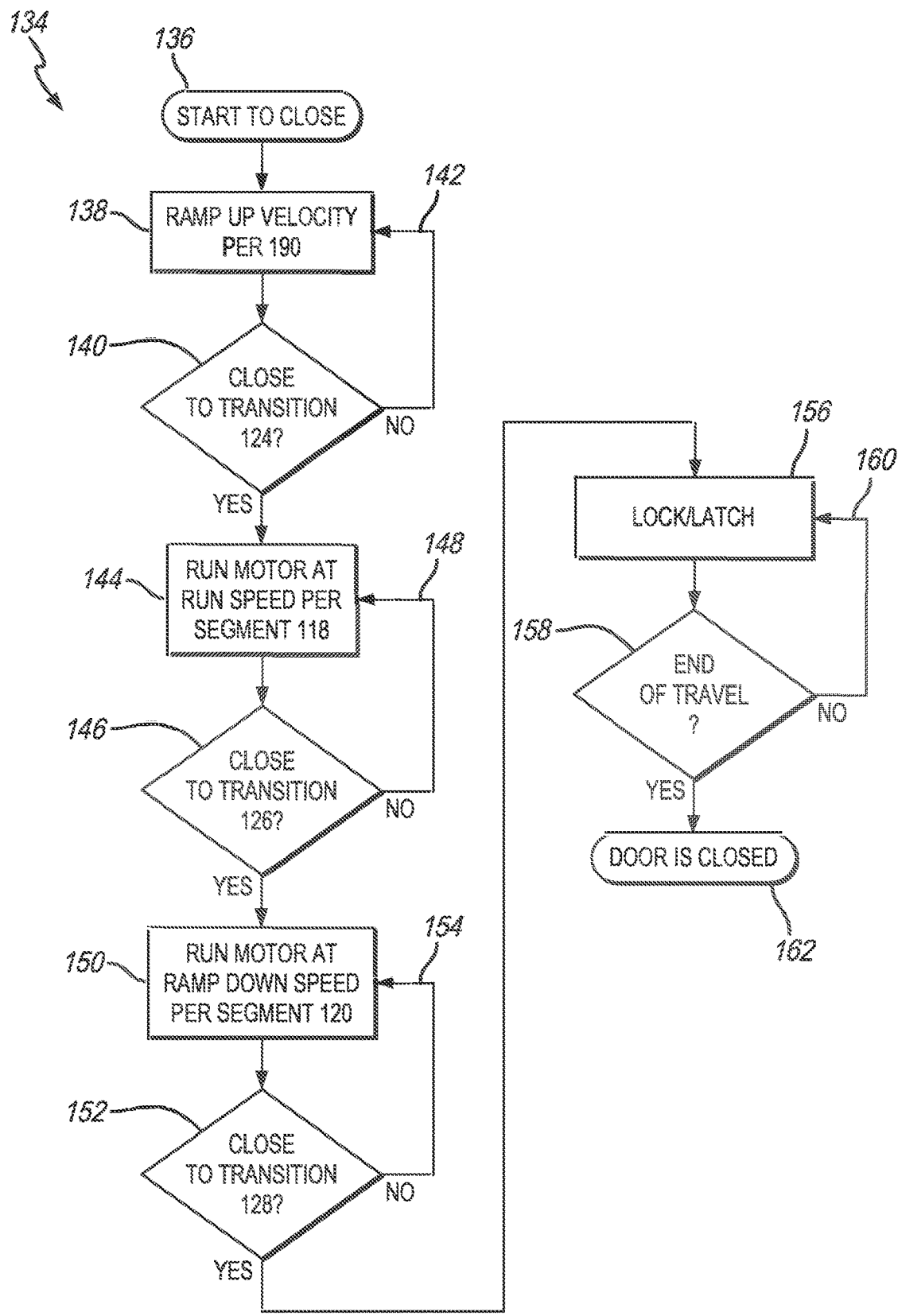
FIG. 8 is a flowchart depicting how the sequencer controls the motor to accelerate and decelerate to close the door.

Flowchart 134 in FIG. 8 depicts how sequencer 6 controls the motor (and hence strut 10) to accelerate and decelerate to engage the door latch and lock assembly 12 to close the cap door according to velocity line 190. Flowchart 134 starts by initiating close button 20 (see, also, FIG. 1) as indicated at 136. This step tells sequencer 6 to begin moving the cap door from its fully open position to its closed position. Once the signal from close button 20 is sent to sequencer 6, sequencer 6 sends a signal to the strut motor operating strut 10 to begin moving the cap door. As the motor accelerates, so too does the cap door represented by acceleration or ramp up segment 190 from FIG. 10, and by reference number 138 in flowchart 134. During this routine, sequencer 6 is continuously monitoring to determine if the cap door has reached a transition distance for this segment and the next. In this instance, sequencer 6 is determining whether the cap door has traveled sufficiently during acceleration or ramp up segment 116 to reach acceleration or ramp up transition 124. This routine is indicated by reference number 140 on flowchart 134. If the answer is no as indicated by reference number 142, the routine repeats with acceleration segment 138 and sequencer 6 continuing to check to determine whether transition distance is reached at 140. Again, the distance traveled by the cap door is calculated to determine a predetermined distance. Upon reaching the predetermined ramp up distance indicated by 140, sequencer 6 operates the strut motor to maintain a predetermined velocity of run segment 118 as indicated by reference number 144. Here, sequencer 6 maintains a constant rate of travel for the cap door during this segment while at the same time monitoring its distance traveled in order to determine whether the next predetermined transition has been reached yet, as indicated by reference numeral 146. If the next transition distance has not been reached, the routine will repeat back to block 144 maintaining the constant velocity of run segment 118 as indicated by line 148. As previously discussed, sequencer 6 continues this loop of operating the motor and calculating the distance of travel until the predetermined transition distance has been reached. When this occurs, as indicated by reference numeral 146, sequencer 6 begins ramp down segment 120 by decelerating the motor as indicated at step 150 on chart 134. Here sequencer 6 slows the strut motor and hence the velocity of the cap door for a predetermined distance. Again, as this is occurring, the routine is checking to see if the distance traveled is approaching the next transition as indicated by reference numeral 152. If the answer is no, as indicated by reference numeral 154, the routine repeats by continuing to decelerate the cap door as indicated at 150. If the transition distance, such as latch and lock transition 128 is reached, sequencer 6 moves to the lock and latch operation as indicated by reference numeral 156. In that process, as indicated on velocity line 114, the door latches to either an electrically operated or mechanical latch as indicated by 122. Sequencer 6 may initiate whatever processes are needed to cause the latch (if electrically operated) to secure the cap door onto the cap. Like the other routines, sequencer 6 here monitors the system to determine if the door is latched and/or locked at 158. If the answer is no, as indicated by reference numeral 160, this routine is repeated until the latch and/or lock process is completed. When that is determined, the cap door is closed as indicated by the end of the process at 162.

Similar to the flowchart 82 shown in FIG. 5, flowchart 168 shown in FIG. 9 depicts how sequencer 6 determines the response to the ERR value during the cap door's travel from open to close positions as represented in FIG. 7. Like the other processes described herein, this process operates in milliseconds so if a large enough ERR variance is detected, appropriate correction can be made before injury or damage occurs. The first step of this sequence, as indicated by block 170, is sequencer 6 detecting movement of the cap door through pulses being generated by rotation of the strut motor, and as indicated by pulses from the Hall Effect sensors. As previously identified with respect to FIG. 5, when this happens, sequencer 6 acquires an initial start time ($t_0$), and sets an initial pulse at zero ($p_0=0$) as indicated at block 172. Sequencer 6 then moves the motor to detect movement of same by a predetermined amount. That amount indicates a number of pulses ($p_1$) as indicated at 174. With this number of pulses counted as ($p_1$), sequencer 6 also acquires the amount of time that has elapsed ($t_1$) during that movement. This step is indicated at reference numeral 176. Then following at 178, sequencer 6 calculates to determine whether the $\Delta P/\Delta t$ is within an acceptable variance, similar to that previously discussed with respect to FIG. 4. And although the calculations will be similar, the acceptable variance represented by $\Delta P/\Delta t$ will change during the retraction process because of the issues relevant to closing a cap door—such as getting a finger or other object caught between the lowering cap door and the cap door's frame. Because this may cause injury, through the sequence represented by flowchart 168, it will determine if there is any change in the number of pulses over time, which is indicative of possibly an obstruction or other anomaly in the path of the closing cap door. If that variance is great enough, it means the likelihood is higher an obstruction exists and corrective action will be taken. That said, if the $\Delta P/\Delta t$ is within a predetermined variance (see also FIG. 10), the process starts again as indicated by line 180 that leads to block 170. This routine repeats itself continuously to ensure the $\Delta P/\Delta t$ is within the variance limits. If during the step at block 178, the $\Delta P/\Delta t$ exceeds the predetermined ERR bounds and ERR condition as indicated, block 182 is established. At this point, sequencer 6 detecting that ERR condition 182 will initiate a corrective action. It will be appreciated by one skilled in the art upon reading the present disclosure that such corrective action may include immediately stopping movement of the cap door or reversing direction of that movement from retracting to extending the cap door.

Figure 10:
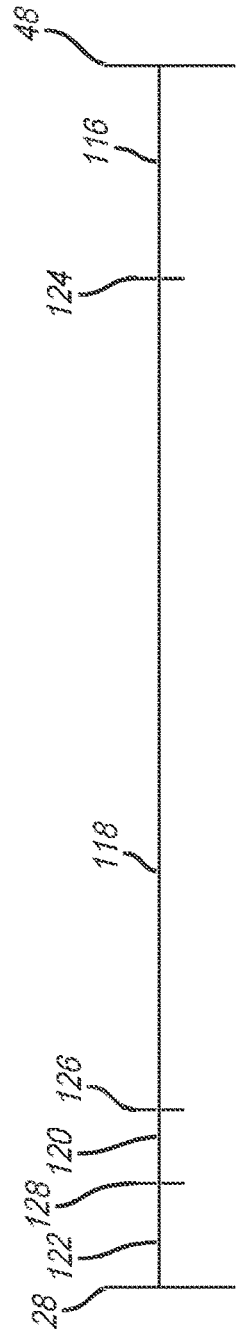
FIG. 10 is another chart showing expected velocity rates during a length of travel of the cap door.
Figure 10:
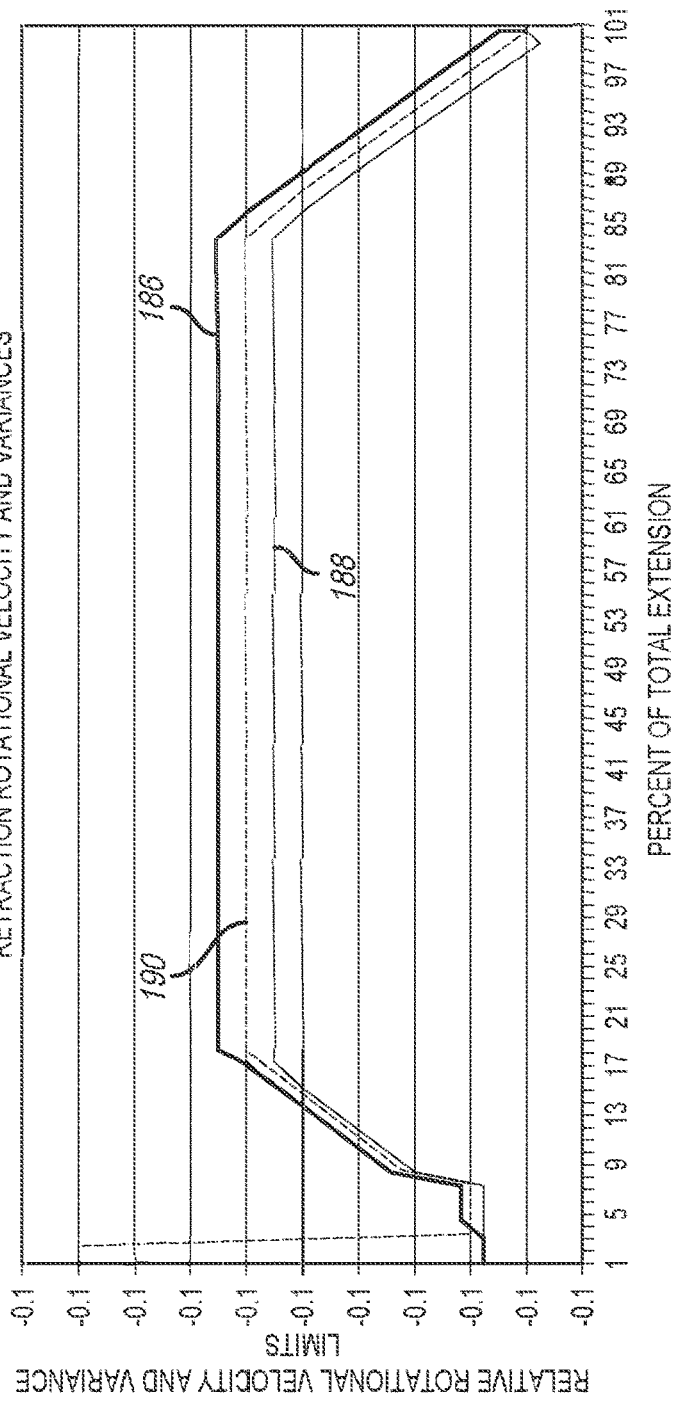

A chart depicting acceptable variance during the retraction process of the cap door is shown in FIG. 10. Here, similar to FIG. 6, the Y-axis of the chart depicts the relative rotation velocity and variance limits in units of, σ or percent/100 or coefficient of variation (unitless), and motor rotational velocity ω/C, where C is a constant of proportionality. The X-axis depicts the percent of total extension. In this case, because it is in retraction, the path of travel of the cap door will be from the right side of the chart to the left side—opposite of the cap door direction of travel in FIG. 6. As shown herein, line 186 represents an upper variance limit which cannot be exceeded without sequencer 6 initiating corrective action. Line 188 conversely represents a lower limit upon which variance may be detected before sequencer 6 initiates corrective action. Line 190 represents the predetermined velocity the cap door should travel during its path of travel from open to close positions. Again, sequencer 6 initiates the routine or sequence depicted in flowchart 168 to determine whether the cap door is moving within an acceptable range of velocities as represented on velocity line 190 as shown in FIG. 7. As shown in FIG. 10, the slopes of lines 186, 188, and 190 are consistent with the segments of travel of the cap door pursuant velocity line 190 of FIG. 10. For example, lines 186, 188, and 190, at the beginning of the chart where the cap door is fully extended at 101%, shows an increase in velocity by the cap door representing acceleration segment 116. It is noted, and consistent with ramp up segment 34 shown in FIG. 6, during the ramp up segment, less variance is acceptable as compared to the corresponding run segment. That said, it is appreciated by viewing lines 186 and 188 that there is more acceptable variance during acceleration segment 116 than there would be during extension of the cap door. This is due to the starting of the close there is lessor obstruction possibility affecting the safety considerations. Once a predetermined velocity is reached as indicated by lines 186, 188, and 190 plateauing as shown in FIG. 10, the cap door is lowering at a constant velocity. It is during this run segment 118 that the most amount of acceptable variance exists. Once the cap door has reached a predetermined distance, it begins to decelerate according to ramp down segment 120. This again has a relatively small amount of acceptable variance before corrective action will be taken due to the high likelihood that obstructions could occur during this segment of travel. This might be because the cap door is close to its end of travel, which means it is close to the doorjamb which surrounds the door opening. Getting a limb, finger, or other object caught between the door and the doorjamb creates the greatest risk of injury.

Accordingly, if anything disturbs the decelerating velocity of the cap door, an ERR condition will most likely be detected. This is intentional because if a finger or limb gets stuck between the door and the jamb, corrective action will want to be initiated immediately. Lastly, during the latch and lock phase, to ensure proper securement of the cap door by the latch at the end of latch and lock segment 122, sequencer 6 may substantially increase motor speed that is applied to strut or struts 10. This function may assist latch and lock assembly 12 to better secure the cap door. It will be appreciated that at about this time the door will be adjacent the doorjamb so there should not be an appreciable risk of a finger or limb getting itself between the door and the jamb. Once the cap door is latched and locked, the sequence concludes.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that any subject matter disclosed in this non-provisional patent application that may differ from the priority application, the disclosure from this non-provisional patent application controls.

What is claimed:

1. A pickup truck bed cover that sits over top a bed section of a pickup truck, the pickup truck bed cover comprising:
   a door movably attached to the pickup truck bed cover;
   wherein the door is movable between an open position and a closed position with respect to the pickup truck bed cover;
   an automatic bed cover drive assembly that moves the door between the open position and the closed position, the automatic bed cover drive assembly includes:
   at least one strut that moves the door;
   a motor that moves the at least one strut;
   a sequencer in electronic communication with the motor and directs operation of the motor;
   wherein the sequencer generates a signal that is sent to the motor to move the at least one strut which moves the door;
   wherein a cycle of the sequencer includes an objective;
   wherein the objective determines a rotational velocity of a motor to move the at least one strut;
   wherein the objective is identified from the group consisting of move the at least one strut from the closed position towards a transition and move the at least one strut from another transition towards the closed position;
   wherein when the objective is identified, movement of the at least one strut is determined by the sequencer, which continuously identifies the objective and identifies a current location of the door with respect to a predetermined velocity curve;
   at least one Hall Effect sensor determines the movement of the at least one strut indicative of the movement of the door;
   wherein the at least one Hall Effect sensor allows a rotational angle of the at least one strut to be detected by the sequencer to determine variance with respect to the predetermined velocity curve for the door;
   wherein the sequencer also detects a direction and a pulse every predetermined number of degrees of rotation of the motor to determine the rotational velocity;
   wherein a relative position of the door is determined by the sequencer and tracked additively from a starting point;
   wherein the sequencer takes both a velocity of the door from the rotation of the at least one Hall Effect sensor on the at least one strut and the relative position of the door from the motor and derives an error value;
   wherein the error value determines whether the at least one strut is functioning within or outside an allowable variance from the predetermined velocity curve;
   wherein when the at least one strut is out of the allowable variance, corrective measures taken selected from the group consisting of the motor continues, stops, or reverses direction of travel;
   wherein the allowable variance is selected from the group consisting of the strut moving the door out of the velocity that is greater than a first predetermined velocity and lesser than a second predetermined velocity; and
   a Proportional Integral Derivative (PID) control in communication with the sequencer to execute movement of the motor to move the at least one strut;
   wherein the error value is sent to the PID control which controls a Proportional Width Modulation (PWM) which drives the motor to accelerate or decelerate the at least one strut;
   wherein the sequencer cyclically monitors movement of the motor to monitor the movement of the at least on strut to determine whether a movement of the door is indicative of an unsafe condition; and
   wherein under circumstances of a no unsafe condition is detected, no corrective action by the sequencer is taken.

2. The pickup truck bed cover of claim 1, wherein when the error value is outside of the allowable variance, corrective action is taken, wherein the corrective action is selected from the group consisting of the at least one strut is stopped when the at least one strut is extending and the at least one strut is extended when the at least one strut is retracting.

3. The pickup truck bed cover of claim 1, wherein once the door reaches about the closed position, a door latch engages and latches onto the pickup truck bed cover to secure the door into place.

4. The pickup truck bed cover of claim 1, wherein the cycle occurs approximately 50 times a second.

5. The pickup truck bed cover of claim 1, wherein the pulse generated from the motor is used to determine rotation of the motor, and wherein an amount of time between each of the pulses provides the rotational velocity.

6. The pickup truck bed cover of claim 5, wherein the pulse is generated about every 36 degrees of rotation of the motor.

7. The pickup truck bed cover of claim 1, wherein a plurality of pulses are generated by the motor that are each detected by the sequencer to monitor velocities and transitions of velocities of the at least one strut.

8. The pickup truck bed cover of claim 1, wherein when the door is moved toward the closed position, the sequencer cyclically monitors movement indicative of the movement of the door, wherein when a change in velocity of the door that deviates from the predetermined velocity curve, indicative of the unsafe condition, the sequencer detects the change in velocity, wherein if the change in velocity is outside the allowable variance, the sequencer changes operation of the motor selected from the group consisting of stops the motor or instructs the motor to reverse the at least one strut's direction to move the door in an opposite direction.

9. The pickup truck bed cover of claim 1, wherein when the door is moved towards the open position, the sequencer cyclically monitors movement indicative of the movement of the door, wherein when a change in velocity of the door that deviates from the predetermined velocity curve, indicative of the unsafe condition, the sequencer detects the change in velocity, wherein if the change in velocity is outside the allowable variance, the sequencer changes operation of the motor selected from the group consisting of stops the motor or instructs the motor to reverse the at least one strut's direction to move the door in an opposite direction.

10. The pickup truck bed cover of claim 1, wherein the pickup truck bed cover is selected from the group consisting of a tonneau cover and a truck bed cap.

* * * * *